US008325937B2

(12) United States Patent
Kuriakose

(10) Patent No.: US 8,325,937 B2
(45) Date of Patent: Dec. 4, 2012

(54) METHOD AND APPARATUS FOR MOUNTING A BATTERY AND A SPEAKER IN AN INFORMATION HANDLING SYSTEM

(75) Inventor: Eldho Kuriakose, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 956 days.

(21) Appl. No.: 12/352,120

(22) Filed: Jan. 12, 2009

(65) Prior Publication Data

US 2009/0123018 A1 May 14, 2009

Related U.S. Application Data

(62) Division of application No. 11/082,261, filed on Mar. 17, 2005, now abandoned.

(51) Int. Cl.
*H04R 1/02* (2006.01)
*G08B 3/00* (2006.01)
*H01M 2/10* (2006.01)

(52) U.S. Cl. ....... 381/87; 381/335; 381/336; 340/388.1; 340/384.1; 340/391.1; 340/396.1; 429/99

(58) Field of Classification Search .................... 381/87, 381/335, 386, 336; 429/99, 96, 98; 340/388.1, 340/384.6, 393.2, 396.1
See application file for complete search history.

(56) References Cited

U.S. PATENT DOCUMENTS 5,738,526 A * 4/1998 Cerda et al. .................. 434/304
5,861,686 A * 1/1999 Lee ................................ 310/36
7,201,996 B1 * 4/2007 Watanabe ...................... 429/99

* cited by examiner

*Primary Examiner* — Devona Faulk
(74) *Attorney, Agent, or Firm* — Haynes and Boone, LLP

(57) ABSTRACT

A battery and speaker mounting apparatus includes a base member including a battery socket positioned adjacent a support surface on the base member, and a speaker chamber defined by the base member and separated from the battery socket by the support surface. A speaker module may be mounted in the speaker chamber, and a battery may be coupled to the battery socket.

16 Claims, 5 Drawing Sheets

METHOD AND APPARATUS FOR MOUNTING A BATTERY AND A SPEAKER IN AN INFORMATION HANDLING SYSTEM

The present application claims priority to and is a Divisional of U.S. Utility application Ser. No. 11/082,261, filed on Mar. 17, 2005 now abandoned, the disclosure which is incorporated herein by reference.

BACKGROUND

The present disclosure relates generally to information handling systems, and more particularly to a method and apparatus for mounting a battery and a speaker in an information handling system.

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Conventional information handling systems typically include a CMOS battery and an on-board speaker. The coupling of the CMOS battery and the on-board speaker to the information handling system raise a number of issues.

The CMOS battery is typically coupled to the information handling system by a battery socket which is mounted to the information handling system circuit board. The battery socket takes up a relatively large amount of space on the circuit board in order to provide the minimal function of securing the battery to the information handling system.

Typical on-board speakers used with conventional information handling systems require high powered drive circuitry, take up a large amount of space on the circuit board, and can be expensive.

Accordingly, it would be desirable to provide method and apparatus for mounting a battery and a speaker in an information handling system absent the disadvantages found in the prior methods discussed above.

SUMMARY

According to one embodiment, a battery and speaker mounting apparatus is provided that includes a base member including a battery socket positioned adjacent a support surface on the base member, and a speaker chamber defined by the base member and separated from the battery socket by the support surface.

A principal advantage of this embodiment is that the battery and the speaker may be mounted together in one mounting apparatus, saving space in the information handling system and allowing a less expensive speaker to be used in the information handling system that requires less power.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

Figure 1:
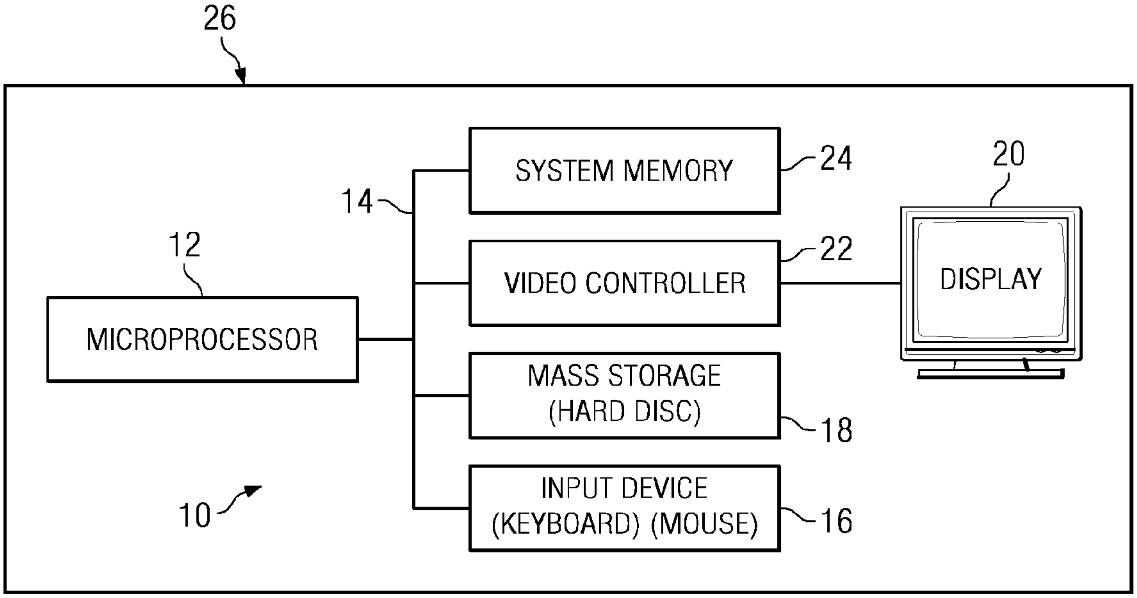
FIG. 1 is a schematic view illustrating an embodiment of an information handling system.

In one embodiment, information handling system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. In an embodiment, a chassis 26 may house some or all of the components of the information handling system 10. It should be understood that other busses and intermediate circuits can be deployed between the components described above and microprocessor 12 to facilitate interconnection between the components and the microprocessor.

Figure 2A:
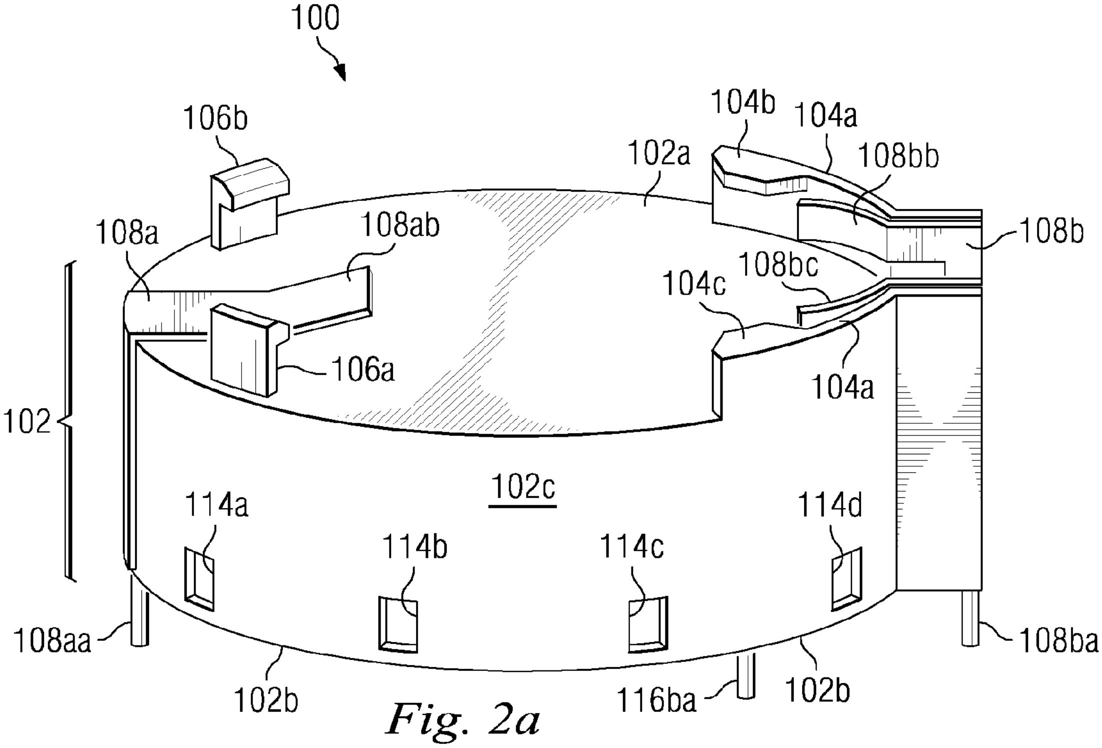
FIG. 2*a* is a perspective view illustrating an embodiment of a battery and speaker mounting apparatus.
Figure 2B:
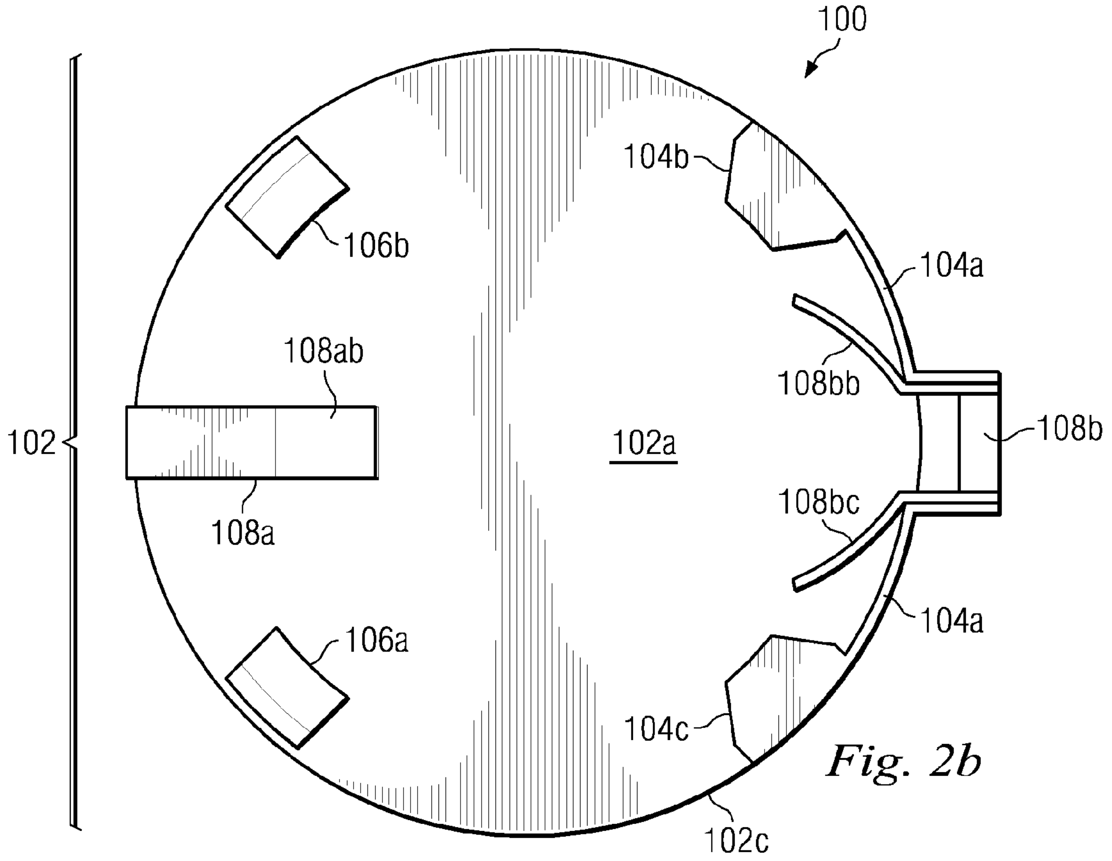
FIG. 2*b* is a top view illustrating an embodiment of the battery and speaker mounting apparatus of FIG. 2*a*.
Figure 2C:
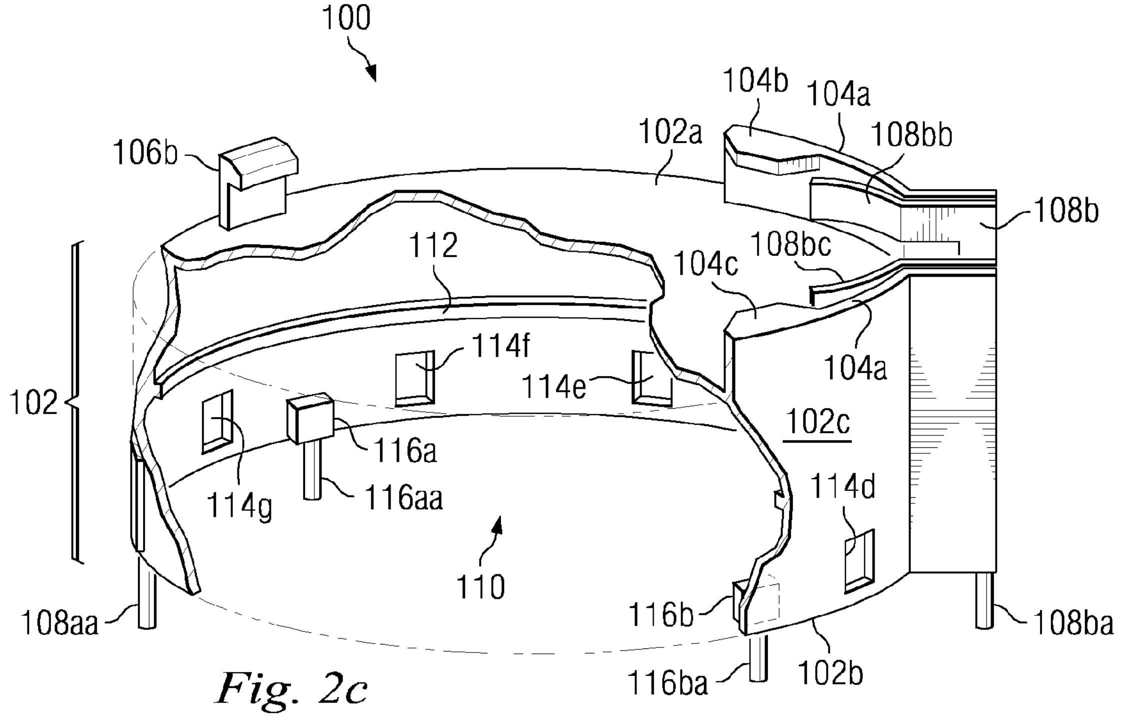
FIG. 2*c* is a cut-away perspective view illustrating an embodiment of the battery and speaker mounting apparatus of FIG. 2*a*.

Referring now to FIGS. 2*a*, 2*b*, and 2*c*, a battery and speaker mounting apparatus 100 is illustrated. Battery and speaker mounting apparatus 100 includes a substantially cylindrical base member 102 having a top support surface 102*a*, a bottom edge 102*b* located opposite the top surface 102*a*, and a side 102*c* located about the circumference of the base member 102 and extending between the top support surface 102*a* and the bottom edge 102*b*. A guide wall 104*a* extends up from the side 102*c* and the top support surface 102*a* of the base member 102 and includes a plurality of securing tabs 104*b* and 104*c* extending out from the guide wall 104 and substantially parallel to the top support surface 102*a* of the base member 102. A plurality of resilient coupling tabs 106*a* and 106*b* extend from the top support surface 102*a* of the base member 102 and are positioned in a spaced apart relationship from each other and on an opposite side of the top support surface 102*a* as the securing tabs 104*b* and 104*c*. An electrical coupler 108*a* is positioned on the top support surface 102*a* and located between the resilient coupling tabs 106*a* and 106*b*. Electrical coupler 108*a* is coupled to a battery pin 108*aa* which extends from the bottom edge 102*b* of the base member 102 and electrical coupler 108*a* includes a distal end 108*ab* which is biased upward from the top support surface 102*a* of base member 102. An electrical coupler 108*b* is positioned adjacent the guide wall 104*a* and located between the securing tabs 104*b* and 104*c*. Electrical coupler 108*b* is coupled to a battery pin 108*ba* which extends from the bottom edge 102*b* of the base member 102 and electrical coupler 108*b* includes a plurality of arms 108*bb* and 108*bc* which are biased away from the guide wall 104*a* and are located adjacent the securing tabs 104*b* and 104*c*, respectively. In an embodiment, the top support surface 102*a*, the guide wall 104*a*, the securing tabs 104*b* and 104*c*, the resilient coupling tabs 106*a* and 106*b*, and the electrical couplers 108*a* and 108*b* provide a battery socket on the base member 102. In an embodiment, the securing tabs 104*b* and 104*c* and the resilient coupling tabs 106*a* and 106*b* provide a plurality of battery coupling members operable to couple a battery to the battery socket.

A substantially cylindrical speaker chamber 110 is defined by the base member 102, located beneath the top support surface 102*a*, and bounded by the side 102*c*. A speaker mounting lip 112 extends from a inner surface of the base member 102 into the speaker mounting chamber 110 and about the circumference of the speaker mounting chamber 110. A plurality of vent apertures 114*a*, 114*b*, 114*c*, 114*d*, 114*e*, 114*f*, and 114*g* are defined by the base member 102 and are positioned in a spaced apart relationship adjacent the bottom edge 102*b* of the base member 102 and about the circumference of the base member 102. The plurality of vent apertures 114*a*, 114*b*, 114*c*, 114*d*, 114*e*, 114*f*, and 114*g* extend from the outer surface of side 102*c*, through the base member 102, and to the speaker chamber 110. An electrical coupling 116*a* is mounted to the base member 102, positioned between vent apertures 114*f* and 114*g*, extends into the speaker chamber 110, and is coupled to a speaker pin 116*aa*. An electrical coupling 116*b* is mounted to the base member 102, positioned between vent apertures 114*c* and 114*d*, extends into the speaker chamber 110, and is coupled to a speaker pin 116*ba*. In an embodiment, the positioning of the of the battery socket and speaker chamber 110 may be reversed such as, for example, by providing a base member 102 including a battery socket with the speaker chamber 110 positioned above the battery socket.

Figure 3A:
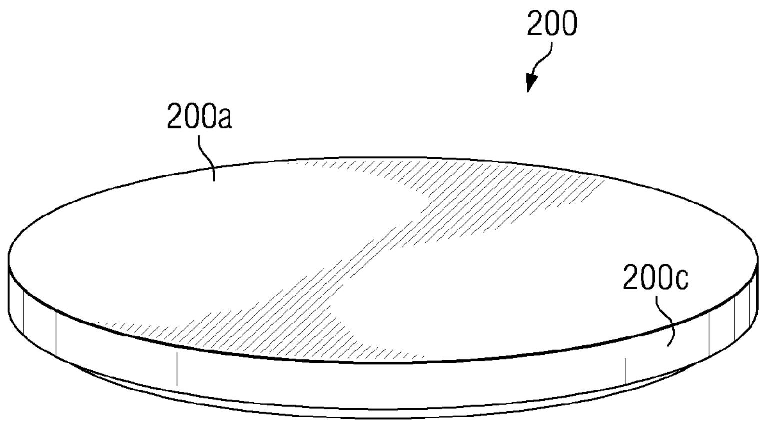
FIG. 3*a* is a top perspective view illustrating an embodiment of a battery used with the battery and speaker mounting apparatus of FIG. 2*a*.
Figure 3B:
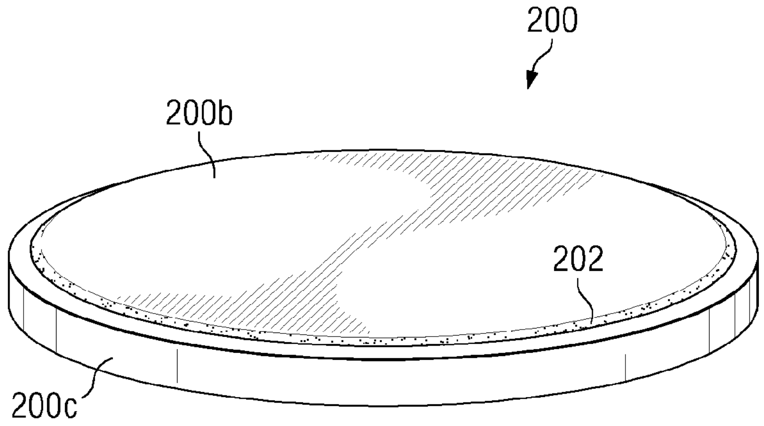
FIG. 3*b* is a bottom perspective view illustrating an embodiment of the battery of FIG. 3*a*.

Referring now to FIGS. 3*a* and 3*b*, a battery 200 is illustrated. Battery 200 is substantially circular and includes a top surface 200*a*, a bottom surface 200*b* located opposite the top surface 200*a*, and a side surface 200*c* extending between the top surface 200*a* and the bottom surface 200*b* and around the circumference of the battery 200. An insulator 202 is positioned on the bottom surface 200*b* and about the circumference of the battery 200 and, in an embodiment, separates a positive terminal of the battery 200, which is located on the top surface 200*a* and side surface 200*c*, from a negative terminal on the battery 200, which is located on the bottom surface 200*b*. In an embodiment, the battery 200 may include a variety of conventional batteries known in the art such as, for example, a CMOS battery.

Figure 4:
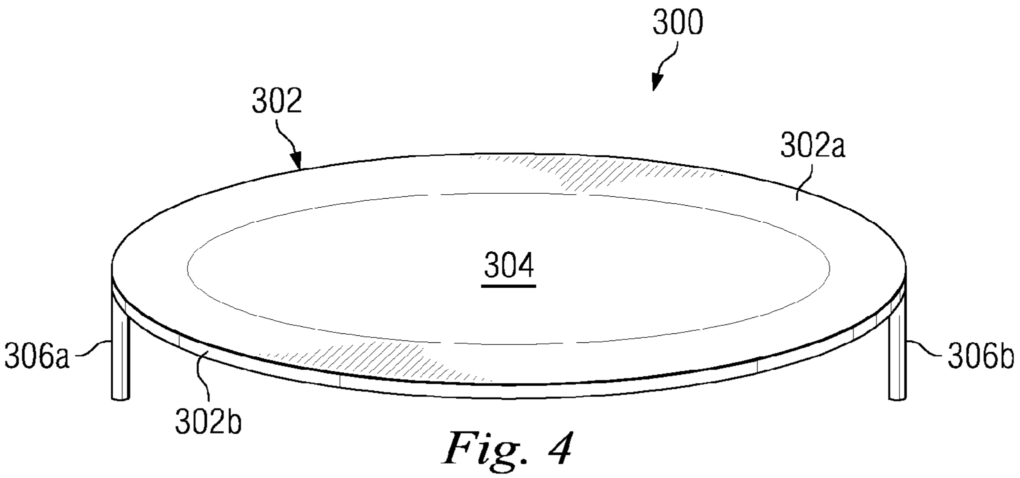
FIG. 4 is a perspective view illustrating an embodiment of a speaker used with the battery and speaker mounting apparatus of FIG. 2*a*.

Referring now to FIG. 4, a speaker module 300 is illustrated. Speaker module 300 is substantially circular and includes an annular speaker mount 302 which is located about the circumference of speaker module 300. Speaker mount 302 includes a top surface 302*a* and a side surface 302*b* extending from the top surface 302*a* and about the circumference of the speaker mount 302. Speaker mount 302 has a diameter that is substantially equal or slightly less than the diameter of the speaker chamber 110, illustrated in FIG. 2*c*. A speaker 304 is coupled to the speaker mount 302 about the circumference of the speaker 304 and is centrally located on the speaker module 300. A plurality of speaker leads 306*a* and 306*b* are electrically coupled to the speaker 304. In an embodiment, the speaker module 300 may be a variety of conventional speakers known in the art such as, for example, a piezo speaker which uses ⅕ to ⅒ the current required for conventional speakers and does not require the fly back protection that conventional speakers require. In an embodiment, the speaker module 300 is substantially the same shape and size as the battery 200. In an embodiment, the speaker module 300 includes an adhesive on the side surface 302*b* and/or the top surface 302*a*.

Figure 5:
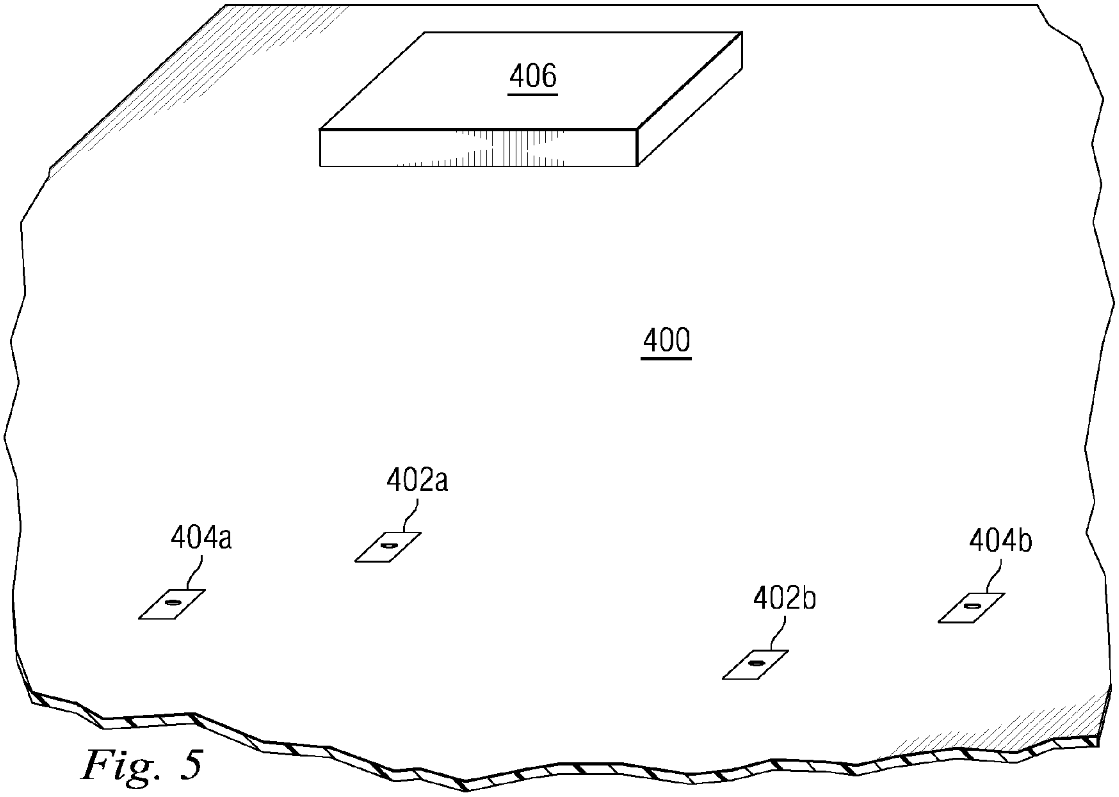
FIG. 5 is a perspective view illustrating an embodiment of a circuit board used with the battery and speaker mounting apparatus of FIG. 2*a*.

Referring now to FIG. 5, a circuit board 400 is illustrated. Circuit board 400 may be mounted in a chassis such as, for example, the chassis 26 illustrated in FIG. 1. A plurality of speaker pin couplers 402*a* and 402*b* are located in a spaced apart relationship on the circuit board 400 and, in an embodiment, are coupled to a power source (not shown) which is coupled to the circuit board 400. A plurality of battery pin couplers 404*a* and 404*b* are located in a spaced apart relationship on the circuit board 400 and positioned adjacent the speaker pin couplers 402*a* and 402*b*. A storage device 406, which may be, for example, the mass storage device 18 illustrated in FIG. 1, is mounted to the circuit board 400 and, in an embodiment, is coupled to the battery pin couplers 404*a* and 404*b*.

Figure 6:
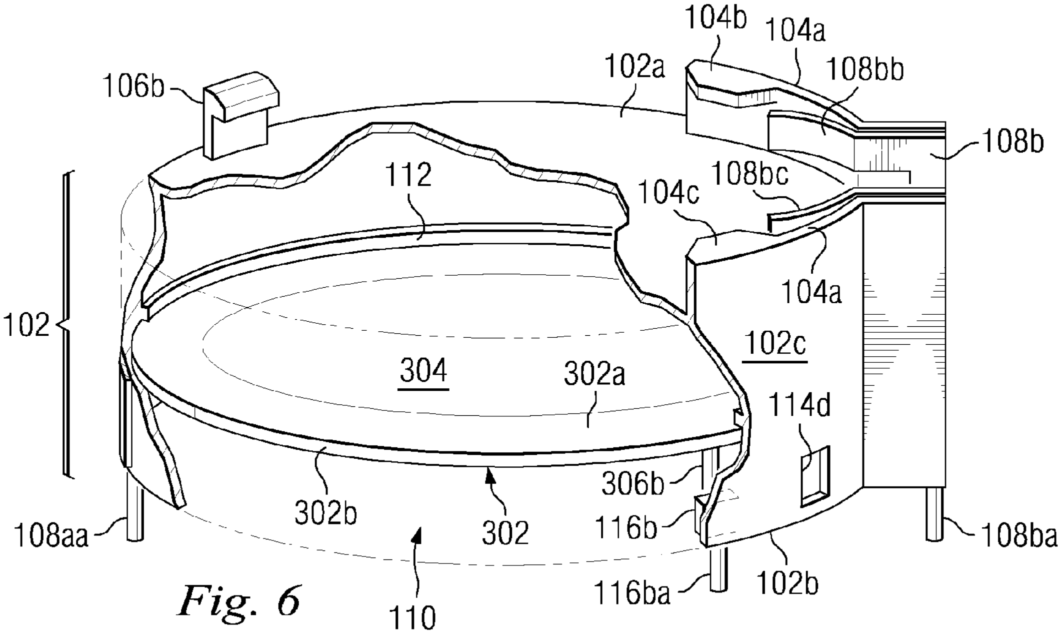
FIG. 6 is a perspective view illustrating an embodiment of the speaker of FIG. 4 coupled to the battery and speaker mounting apparatus of FIG. 2*a*.

Referring now to FIGS. 2*c* and 6, in operation, the speaker module 300 is coupled to the base member 100. Speaker module 300 is positioned such that the side 302*b* of speaker mount 302 is adjacent the bottom edge 102*b* of the base member 102. The speaker module 300 may then be moved into the speaker chamber 110 such that the top surface 302*a* on speaker mount 302 engages the speaker mounting lip 112. In an embodiment, with the top surface 302*a* of the speaker mount 302 engaging the speaker mounting lip 112, the side surface 302*b* on the speaker mount 302 is positioned above the vent apertures 114*a*, 114*b*, 114*c*, 114*d*, 114*e*, 114*f*, and 114*g*. The speaker module 300 may then be coupled to the base member 100 by, for example, using adhesive on the top surface 302*a* and/or the side surface 302*b* of the speaker mount 302, and/or by using a mechanical fastener known in the art. Speaker leads 306*a* and 306*b* on speaker module 300 are then coupled to the electrical couplings 116*a* and 116*b*, respectively, on the base member 100 such that the speaker module 300 is electrically coupled to the speaker pins 116*aa* and 116*ba*.

Figure 7:
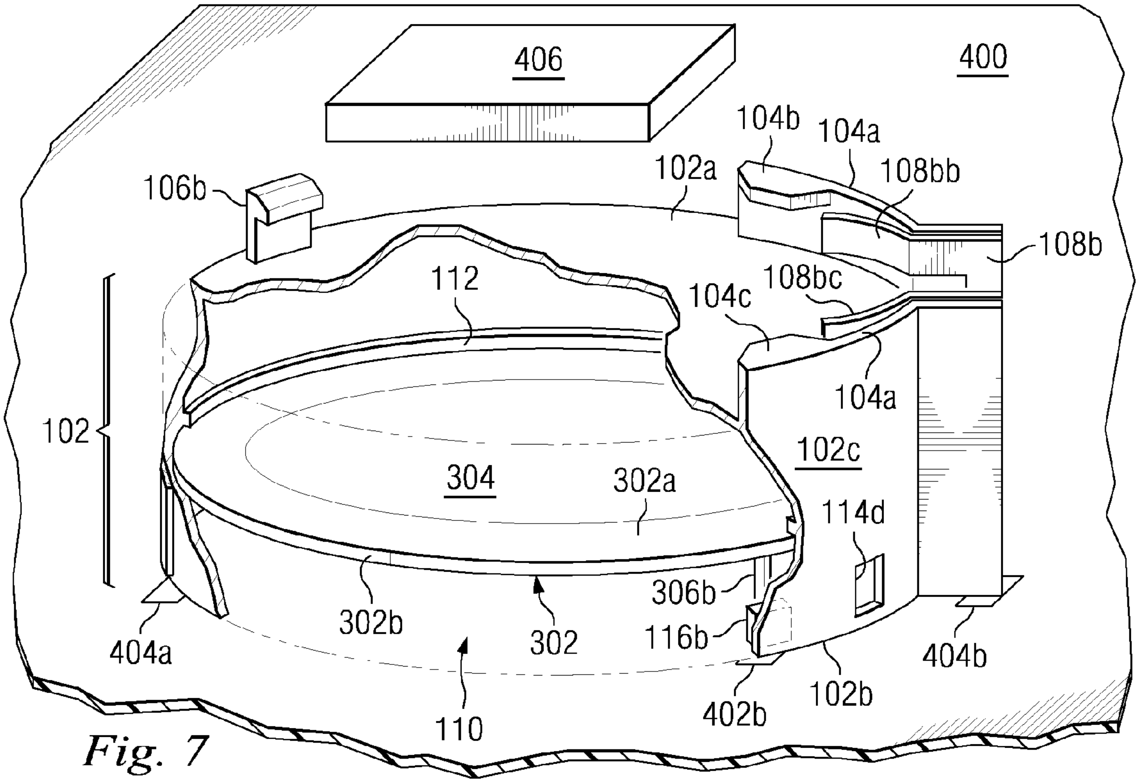
FIG. 7 is a perspective view illustrating an embodiment of speaker and the battery and speaker mounting apparatus of FIG. 6 coupled to the circuit board of FIG. 5.
Figure 8:
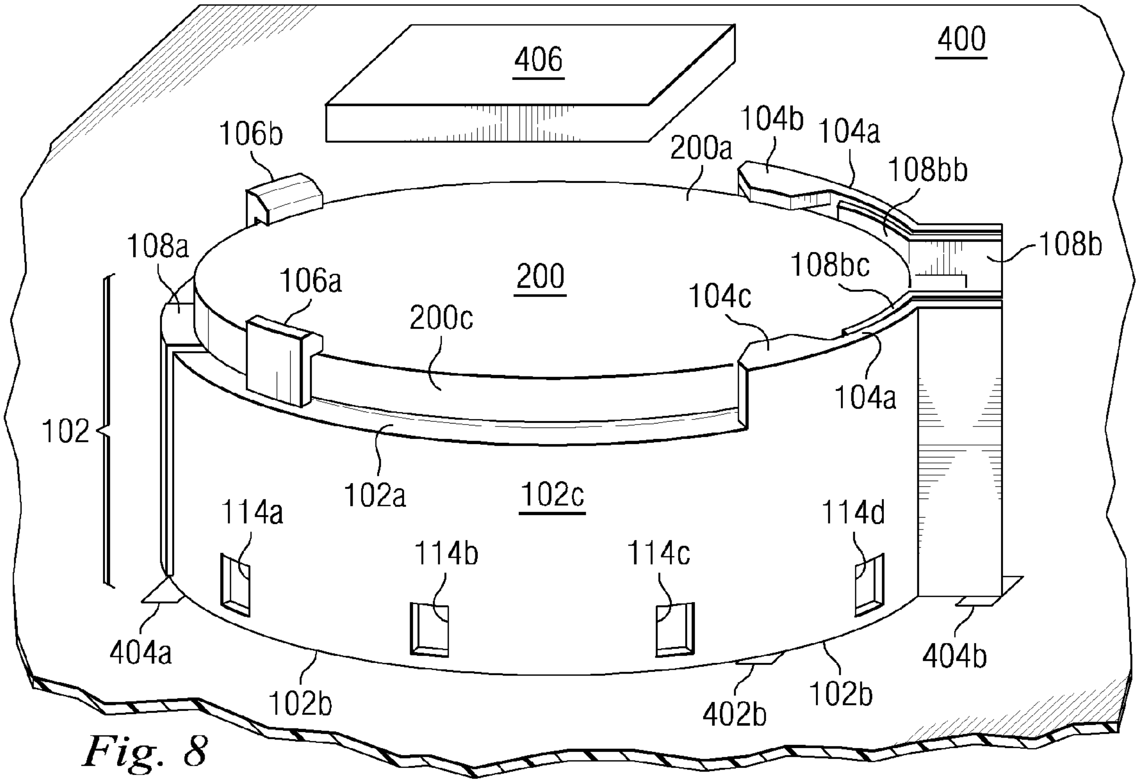
FIG. 8 is a perspective view illustrating an embodiment of the battery of FIG. 3*a* coupled to the battery, the battery and speaker mounting apparatus, and the circuit board of FIG. 7.

Referring now to FIGS. 2*c*, 5, and 7, the base member 100 is then coupled to the circuit board 400. Base member 100 is positioned over the circuit board 400 such that speaker pins 116*aa* and 116*ba* are lined up with speaker pin couplers 402*a* and 402*b*, respectively, and battery pins 108*aa* and 108*ba* are lined up with battery pin couplers 404*a* and 404*b*, respectively. Base member 100 is then lowered such that speaker pins 116*a* and 116*ba* engage and couple to speaker pin couplers 402*a* and 402*b*, respectively, battery pins 108*aa* and 108*ba* engage and couple to battery pin couplers 404*a* and 404*b*, and bottom edge 102*b* of base member 100 engages circuit board 400. In an embodiment, bottom edge 102*b* of base member 100 may be coupled to the circuit board 400 by a variety of means known in the art such as, for example, an adhesive and/or mechanical fastener. In an embodiment, with the base member 100 coupled to the circuit board 400, the electrical couplers 108*a* and 108*b* on base member 100 are electrically coupled to the storage device 406 and the speaker 300 is electrically coupled to a power source which is coupled to the circuit board 400.

Referring now to FIGS. 2*a*, 3*a*, 3*b*, and 8, the battery 200 is coupled to the battery socket on base member 100. Side surface 200*c* of battery 200 is positioned adjacent the securing tabs 104*b* and 104*c*, with bottom surface 200*b* on battery 200 engaging top support surface 102*a* on base member 100. The battery 200 is then moved towards the securing tabs 104*b* and 104*c* such that securing tabs 104*b* and 104*c* engage top surface 200*a* of battery 200 and side surface 200*c* of battery 200 engages the arms 108*bb* and 108*bc* of electrical coupler 108*b*. Battery 200 is then engaged with the resilient coupling tabs 106*a* and 106*b* which, in response to engagement with the bottom surface 200*b* of battery 200, resiliently bend out of the way of battery 200 and allow bottom surface 200*b* of battery 200 to engage electrical coupler 108*a*. Battery 200 is coupled to the battery socket on base member 100 when resilient coupling tabs 106*a* and 106*b* engage the top surface 200*a* of battery 200. The biasing of distal end 108*ab* on electrical coupler 108*a* and the arms 108*bb* and 108*bc* of electrical coupler 108*b* provides contact between the side surface 200*c* of battery 200 and the electrical coupler 108*b* and the bottom surface 200*b* of battery 200 and the electrical coupler 108*a*, resulting in the electrical coupling the battery 200 to the storage device 406.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A battery and speaker mounting apparatus comprising:

a substantially cylindrical base member including a top surface and a side surface;

a battery socket defined adjacent the top surface by a plurality of tabs that extend from the top surface;

a plurality of electrical battery couplers positioned adjacent the battery socket and operable to engage a battery when the battery is positioned in the battery socket;

a substantially cylindrical speaker chamber defined by the base member between the top surface and the side surface and separated from the battery socket by the top surface, wherein a speaker entrance to the speaker chamber is defined by the base member and positioned adjacent the side surface and opposite the top surface;

at least one vent aperture defined by the side surface; and a speaker mounting lip extending from the side surface and into the speaker chamber, wherein the speaker mounting lip is operable to engage a substantially circular piezo speaker when the speaker is moved through the speaker entrance and into the speaker chamber in order to position the speaker in the speaker chamber such that the at least one vent aperture is located opposite the speaker from the speaker mounting lip.

2. The apparatus of claim 1 wherein the plurality of tabs include a plurality of resilient coupling tabs and a plurality of securing tabs that are operable to engage a battery to secure the battery in the battery socket.

3. The apparatus of claim 1 wherein the plurality of electrical battery couplers are operable to electrically couple a battery to a power consuming component.

4. The apparatus of claim 1 further comprising:

at least one speaker pin extending from the side surface and into the speaker chamber, wherein the at least one speaker pin is operable to engage a speaker when the speaker is positioned in the speaker chamber, and wherein the at least one speaker pin is operable to engage a speaker pin coupler on a circuit board when the battery and speaker mounting apparatus is mounted to the circuit board.

5. The apparatus of claim 1:

wherein the speaker mounting lip is located between the at least one vent aperture and the top surface and operable to engage a speaker when the speaker is positioned in the speaker chamber in order to position the speaker in the speaker chamber such that the at least one vent aperture is located opposite the speaker from the speaker mounting lip and the speaker is located between the at least one vent aperture and the top surface.

6. The apparatus of claim 1 further comprising:

at least one battery pin extending from the side surface and coupled to the plurality of electrical battery couplers, wherein the at least one battery pin is operable to engage a battery pin coupler on a circuit board when the battery and speaker mounting apparatus is mounted to the circuit board.

7. The apparatus of claim 1 wherein the battery socket is substantially cylindrical and has substantially the same diameter as the speaker chamber.

8. A battery and speaker mounting apparatus comprising:

a substantially cylindrical base member including a top surface and a side surface;

a battery socket defined adjacent the top surface by a plurality of tabs that extend from the top surface;

a plurality of electrical battery couplers positioned adjacent the battery socket;

a substantially cylindrical speaker chamber defined by the base member between the top surface and the side surface and positioned opposite the top surface from the battery socket, wherein a speaker entrance to the speaker chamber is defined by the base member and positioned adjacent the side surface and opposite the top surface;

at least one vent aperture defined by the side surface;

a speaker mounting lip extending from the side surface and into the speaker chamber;

a battery secured in the battery socket through engagement with the plurality of tabs and electrically coupled to the plurality of electrical couplers; and a substantially circular piezo speaker module housed in the speaker chamber and engaging the speaker mounting lip such that the speaker is positioned in the speaker chamber such that the at least one vent aperture is located opposite the speaker from the speaker mounting lip.

9. The apparatus of claim 8 wherein the plurality of tabs include a plurality of resilient coupling tabs and a plurality of securing tabs that engage the battery to secure the battery in the battery socket.

10. The apparatus of claim 8 wherein the plurality of electrical battery couplers electrically couple the battery to a power consuming component.

11. The apparatus of claim 8:

wherein the speaker mounting lip is located between the at least one vent aperture and the top surface and engages the speaker in order to position the speaker in the speaker chamber such that the at least one vent aperture is located opposite the speaker from the speaker mounting lip and the speaker is located between the at least one vent aperture and the top surface.

12. The apparatus of claim 8 wherein the battery socket is substantially cylindrical and has substantially the same diameter as the speaker chamber.

13. The apparatus of claim 8 wherein the battery comprises a CMOS battery.

14. The apparatus of claim 8 wherein the battery has substantially the same diameter as the speaker module.

15. A method for mounting a battery and a speaker in an information handling system comprising:

providing a circuit board including a storage coupled to the circuit board;

providing a mounting apparatus comprising a substantially cylindrical base member including a top surface and a side surface, a battery socket defined adjacent the top surface by a plurality of tabs that extend from the top surface, a plurality of electrical battery couplers positioned adjacent the battery socket, a substantially cylindrical speaker chamber defined between the top surface and the side surface and separated from the battery socket by the top surface, a speaker entrance to the speaker chamber positioned adjacent the side surface and opposite the top surface, at least one vent aperture defined by the side surface, and a speaker mounting lip that extends from the side surface and into the speaker chamber;

coupling a substantially circular piezo speaker module to the base member and housing the speaker module in the speaker chamber by moving the speaker module through the speaker entrance and into the speaker chamber until the speaker module engages the speaker mounting lip to position the speaker module in the speaker chamber such that the at least one vent aperture is located opposite the speaker from the speaker mounting lip; and mounting the base member to the circuit board.

16. The method of claim 15 further comprising:

coupling a battery to the base member by engaging the battery with the plurality of tabs to secure the battery in the battery socket, wherein the coupling of the battery to the base member engages the battery with the plurality of electrical couplers to electrically couple the battery to the storage.

* * * * *